United States Patent
Grau Garcia et al.

(10) Patent No.: US 11,168,261 B2
(45) Date of Patent: Nov. 9, 2021

(54) METHOD AND APPARATUS FOR RECOVERING FIBERS EMBEDDED IN A COMPOSITE MATERIAL

(71) Applicants: BCIRCULAR COMPOSITES, SOCIEDAD LIMITADA, Sant Andreu de la Barca (ES); CONSEJO SUPERIOR DE INVESTIGACIONES CIENTÍFICAS (CSIC), Madrid (ES)

(72) Inventors: Roger Grau Garcia, Sant Andreu de la Barca (ES); Ferran Grau Garcia, Sant Andreu de la Barca (ES); Oriol Grau Garcia, Sant Andreu de la Barca (ES); Felix Antonio Lopez Gomez, Sant Andreu de la Barca (ES); Olga Rodriguez Largo, Sant Andreu de la Barca (ES)

(73) Assignees: BCIRCULAR COMPOSITES, SOCIEDAD LIMITADA, Sant Andreu de la Barca (ES); CONSEJO SUPERIOR DE INVESTIGACIONES CIENTÍFICAS (CSIC), MADRID (ES)

(*) Notice: Subject to any disclaimer, the term of this patent is extended or adjusted under 35 U.S.C. 154(b) by 8 days.

(21) Appl. No.: 16/618,743

(22) PCT Filed: Jun. 1, 2018

(86) PCT No.: PCT/EP2018/064539
§ 371 (c)(1),
(2) Date: Dec. 2, 2019

(87) PCT Pub. No.: WO2018/220217
PCT Pub. Date: Dec. 6, 2018

(65) Prior Publication Data
US 2020/0165525 A1    May 28, 2020

(30) Foreign Application Priority Data
Jun. 2, 2017 (EP) .................................. 17382330

(51) Int. Cl.
*C10B 53/00* (2006.01)
*C10B 57/00* (2006.01)
(Continued)

(52) U.S. Cl.
CPC ............ *C10G 1/002* (2013.01); *B01J 19/245* (2013.01); *B29B 17/04* (2013.01); *C10B 53/07* (2013.01);
(Continued)

(58) Field of Classification Search
CPC .............................. C10B 53/07; C10B 57/005
See application file for complete search history.

(56) References Cited

U.S. PATENT DOCUMENTS 6,758,150 B2 * 7/2004 Ballantine ............... C10B 47/44
110/110
9,096,801 B2 * 8/2015 Baker ..................... C10B 47/18
(Continued)

FOREIGN PATENT DOCUMENTS

EP    1577366 A2    9/2005
EP    2783764 A1    10/2014
(Continued)

OTHER PUBLICATIONS

International Search Report for International Application No. PCT/EP2018/064539, issued by the European Patent Office, dated Jul. 3, 2018, 4 pages, and Written Opinion of the International Searching Authority, 7 pages, Rijswijk, Netherlands.

*Primary Examiner* — Jonathan Luke Pilcher
(74) *Attorney, Agent, or Firm* — Peter B. Scull; EIP US LLP

(57) ABSTRACT

A method for recovering fibers embedded in a composite material including loading a furnace chamber with a volume
(Continued)

of the composite material; thermolyzing the composite material in the furnace chamber, resulting in a gaseous fraction that is continuously evacuated from the furnace chamber, and a residue of fibers covered with char that is left in the furnace chamber; cracking the gaseous fraction from the thermolyzing operation, resulting in a mixture of condensable and non-condensable gases that can be recycled; injecting a stream of an oxygen-containing gas into the still hot furnace chamber after the thermolyzing is completed therein, to burn the char from the fibers in an exothermic combustion.

14 Claims, 3 Drawing Sheets

(51) Int. Cl.

| | |
|---|---|
| C10G 1/00 | (2006.01) |
| B01J 19/24 | (2006.01) |
| B29B 17/04 | (2006.01) |
| C10B 53/07 | (2006.01) |
| C10G 1/02 | (2006.01) |
| C10G 1/10 | (2006.01) |

(52) U.S. Cl.
CPC ............. *C10B 57/005* (2013.01); *C10G 1/02* (2013.01); *C10G 1/10* (2013.01); *B01J 2219/0004* (2013.01); *B29B 2017/0496* (2013.01); *C10G 2300/1003* (2013.01); *C10G 2400/06* (2013.01)

(56) References Cited

U.S. PATENT DOCUMENTS

| | | | |
|---|---|---|---|
| 2003/0010266 A1* | 1/2003 | Ballantine | C10K 1/08 110/229 |
| 2004/0173239 A1 | 9/2004 | Grove-Nielsen | |
| 2007/0179326 A1* | 8/2007 | Baker | C10B 53/07 585/241 |
| 2015/0218457 A1* | 8/2015 | Jacobsen | F23G 5/50 201/20 |
| 2016/0039118 A1 | 2/2016 | Gehr | |

FOREIGN PATENT DOCUMENTS

| | | |
|---|---|---|
| EP | 3023478 A2 | 5/2016 |
| EP | 3409749 A1 | 5/2018 |
| JP | 2008285601 A | 11/2008 |

* cited by examiner

METHOD AND APPARATUS FOR RECOVERING FIBERS EMBEDDED IN A COMPOSITE MATERIAL

The present disclosure relates to a method and an apparatus for recovering fibers embedded in a composite material, the apparatus including a furnace chamber for thermolyzing a volume of the composite material, which is a functional part of the method.

BACKGROUND

A composite material is a material made from two or more components (constituent materials) with different physical or chemical properties that, when combined, produce a material (the composite) with characteristics different from the individual components and superior thereto. The individual components enhance each other but remain separate and distinct within the composite. There are two main categories of constituent materials: a continuous phase called 'matrix' (or 'binder') and a scattered phase called 'reinforcement'. The matrix material surrounds and supports the reinforcement materials by maintaining their relative positions, and bestows thermal and environmental resistance upon the composite. The reinforcements impart their special mechanical and physical properties to strengthen the matrix, for instance to prevent crack propagation.

Polymers are typical matrices especially used for fiber-reinforced plastics, wherein the fibers constitute the reinforcement. Most common polymer-based composite materials include a resin, e.g. epoxy resin. For example, composite materials are frequently used for the rotor blades of a wind turbine; typical resins used for these composites include polyester and epoxy, while glass and carbon fibers are often employed as reinforcement.

In view of increasing environmental concerns, an important issue has arisen regarding how to recycle fiber-reinforced plastic members without simply processing such members by mere (and hazardous) combustion or landfilling. In particular, the recycling of wind turbine blades made from composite materials constitutes a problem because of the large dimensions of the blades, and also because of the difficulty of safely pulling the fibers apart from the polymer with the resin, but it is nevertheless advisable to try to recover the fiber content of fiber-reinforced plastics, instead of just disposing of it, in order to reuse the fibers in newly produced fiber-reinforced plastic members, for example new wind turbine blades.

Disclosed has been a method including a thermal process in which the composite material is pyrolyzed at a relatively low temperature in a closed furnace chamber with an inactive atmosphere, for example in the form of nitrogen. The temperature and combustion conditions are intended for the matrix to be gasified while leaving the fibers more or less intact, thus making recycling possible, at least in principle.

SUMMARY

Provided here are a method and an apparatus to efficiently recycle fibers from discarded fiber-reinforced plastic members, thus making it feasible to recover and reuse the fibers.

In a first aspect, a method for recovering fibers embedded in a composite material is provided. The method includes the operations of: loading a furnace chamber (for example, a first furnace chamber, anticipating the possibility of further furnace chambers but without precluding a single furnace chamber) with a volume of the composite material; thermolyzing the composite material in said furnace chamber, resulting in gaseous fraction that is continuously evacuated from the furnace chamber, and a residue of fibers covered with char that is left in the furnace chamber; cracking the gaseous fraction from the thermolyzing or thermolysis operation, resulting in a mixture of condensable and non-condensable gases; injecting a stream of an oxygen-containing gas into the still hot furnace chamber after the thermolysis is completed therein, in order to burn the char from the fibers in an exothermic combustion.

The term "cracking" is herein used to encompass the splitting of complex molecules into simpler ones under the influence of heat and catalysts. In the present context, the cracking of the thermolysis gases into condensable and non-condensable gases is a useful way to treat the gaseous residues from the thermolysis because the condensable gases can, for example, be condensed and used as fuel.

The thermolyzing or thermolysis (or thermal decomposition) may be a pyrolysis, i.e. a thermolysis in the absence of oxygen (or any halogen). The thermolysis or the pyrolysis may be performed under vacuum in order to speed it up, for example at 0.1-0.9 bars.

The oxygen-containing gas may contain $O_2$ and/or $O_3$ (ozone). The use of ozone may speed up the exothermic combustion. The oxygen-containing gas may be air enriched with 2-20% in volume of oxygen.

In an example, the loading of the furnace chamber may be done through use of a cage that can be filled with the composite material outside the chamber and can be loaded into the chamber very quickly, whereby the aperture time of furnace chamber would be shortened (or even minimized), which would improve the energy efficiency of the process.

In an example, the method further includes an operation of using the non-condensable gases for contributing heat to the furnace chamber in the thermolysis or pyrolysis operation, thus improving the energy efficiency of the process. Alternatively or complementarily, the non-condensable gases may be used for cogeneration, which also improves the overall energy efficiency.

The cracking operation may be performed by circulating the gaseous fraction through a reducing agent, particularly through a catalyst, like for example SiC or zeolite.

In an example, two furnace chambers might be used, the above-mentioned first furnace chamber and a second furnace chamber, so that the method would further include the operations of:

loading the second furnace chamber with a volume of the composite material;

thermolyzing the composite material in the second furnace chamber, with heat being contributed by the combustion that is taking or has taken place in the first furnace chamber, resulting in a gaseous fraction that is continuously evacuated from the second furnace chamber, and a residue of fibers covered with char that is left in the second furnace chamber;

cracking the gaseous fraction from the thermolysis operation in the second furnace chamber, resulting in a mixture of condensable and non-condensable gases;

unloading the clean fibers from the first furnace chamber and loading the latter with a volume of the composite material;

injecting a stream of an oxygen-containing gas into the still hot second furnace chamber after the thermolysis is completed therein, to burn the char from the fibers in an exothermic combustion;

thermolyzing the composite material in the first furnace chamber, with heat being contributed by the combustion that is taking or has taken place in the second furnace chamber, resulting in a gaseous fraction that is continuously evacuated from the first furnace chamber, and a residue of fibers covered with char that is left in the first furnace chamber;

cracking the gaseous fraction from the thermolysis operation in the first furnace chamber, resulting in a mixture of condensable and non-condensable gases;

unloading the clean fibers from the second furnace chamber and loading the latter with a volume of the composite material;

injecting a stream of an oxygen-containing gas into the still hot first furnace chamber after the thermolysis is completed therein, to burn the char from the fibers in an exothermic combustion.

In this way, by alternating between the first furnace chamber and the second furnace chamber, the energy efficiency of the process is further improved.

As before, the thermolysis may be a pyrolysis, and the other variants explained above (in relation to one furnace chamber) may also be applied herein (in relation to two furnace chambers).

In a second aspect, an apparatus to carry out this two-chamber method is provided.

In a third aspect, an apparatus for recovering fibers embedded in a composite material is provided. The apparatus includes a furnace chamber for thermolyzing (or pyrolyzing) a volume of the composite material, which can produce the above-mentioned gaseous fraction, and a reducing agent (e.g. a catalyst) for cracking the gaseous fraction, which can produce the above-mentioned mixture of condensable and non-condensable gases.

In either apparatus, the heating of the furnace chamber (or chambers) may be carried out, perhaps partially, by a gas burner fueled (at least in part) by the non-condensable gases produced in the cracking operation. However, alternative or complementary methods or apparatuses to heat the furnace chamber may also be envisaged, such as methods or apparatuses for radiation, convection, induction, micro-wave, or electric resistance, etc.

Further advantages, properties, aspects and features of the present disclosure may be derived from the below-described examples. The above-described features and/or the features disclosed in the claims and/or in the following description of examples can, if required, also be combined with one another even if this is not expressly described in detail.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
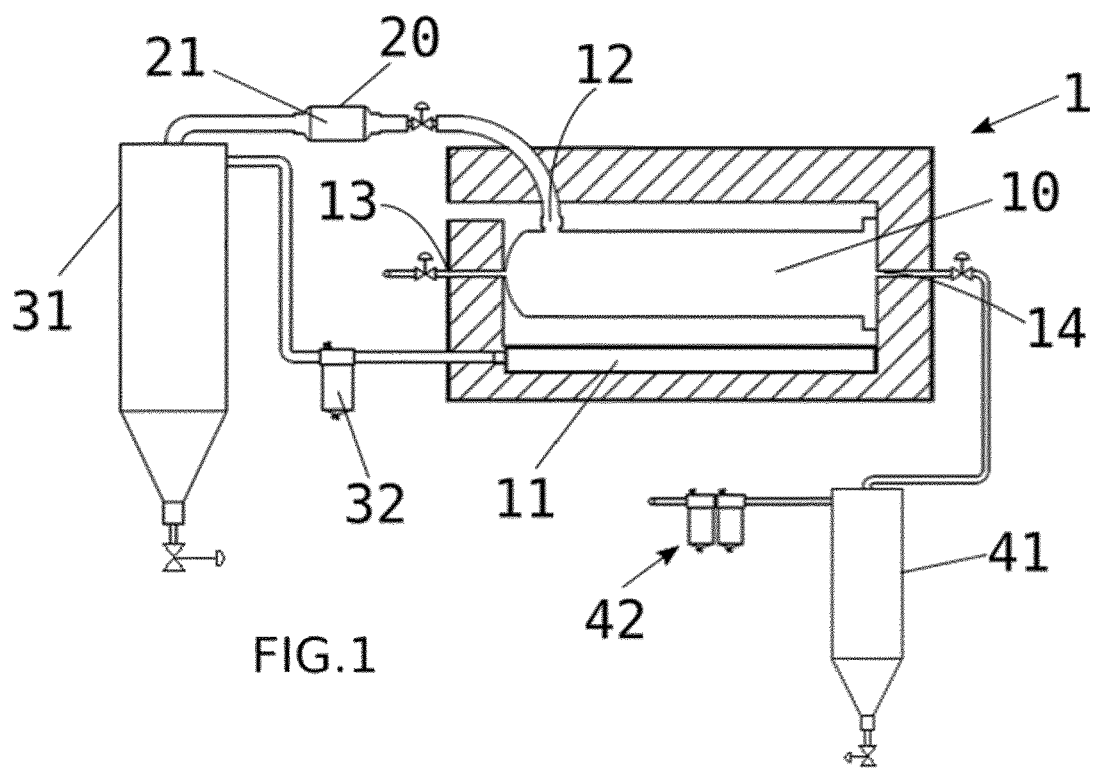
FIG. 1 is a schematic view of an apparatus for recovering fibers embedded in a composite material.
Figure 2:
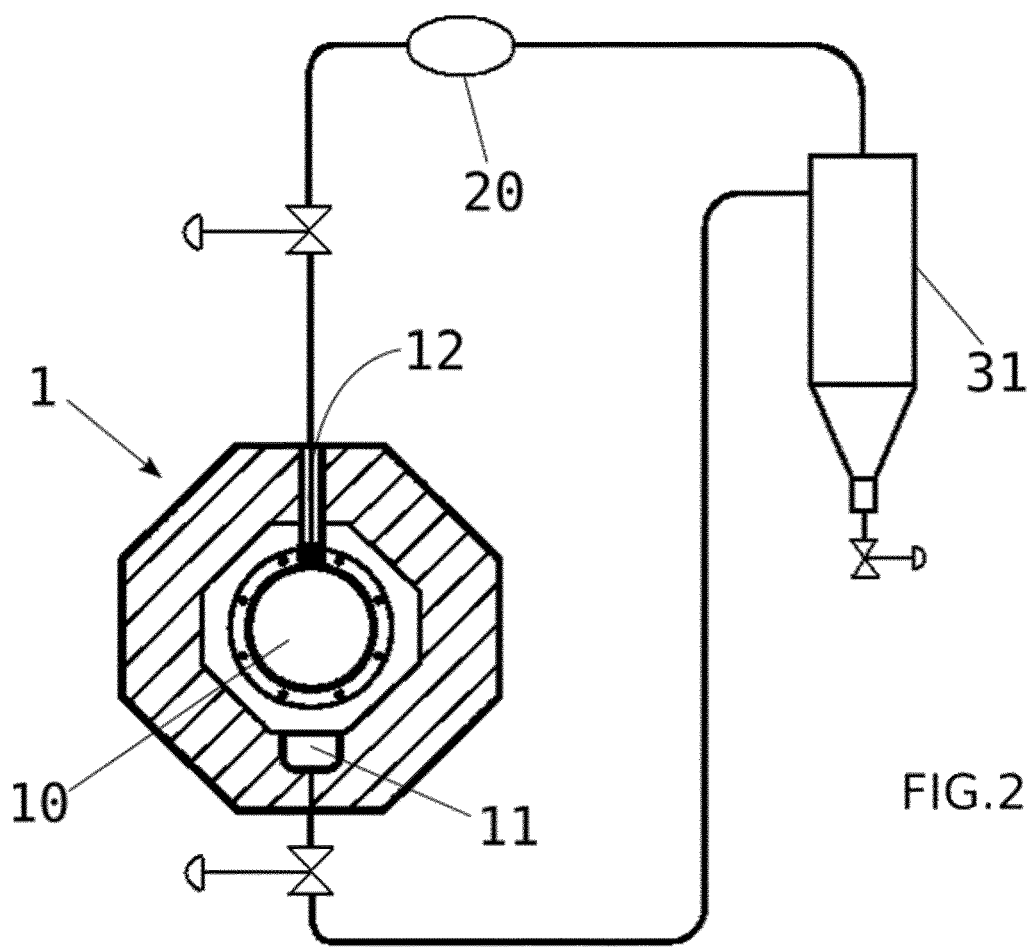
FIG. 2 is another schematic view of the apparatus of FIG. 1.

The apparatus of FIGS. 1 and 2 includes a furnace 1 provided with a furnace chamber 10, a burner 11 for the chamber 10, a first outlet 12 from the chamber 10, an inlet 13 to the chamber 10 and a second outlet 14 therefrom. The first outlet 12 leads (through a conduit) to a reducing member 20 including a reducing agent 21, for example zeolite or an SiC catalyst. Downstream from the catalyst is a condenser 31, from which non-condensable gases can be brought, through a filter 32, to the burner 11.

The inlet 13 allows for injection of a stream of air (or other oxygen-containing gas) into the furnace chamber 10, and the second outlet 14 is to evacuate combustion gases from the furnace chamber 10 to a separator (e.g. a cyclone) 41 and some further filters 42. The apparatus also includes suitable valves in the conduits.

The operation with the apparatus is as follows (the goal is to extract clean fibers from a discarded part made of a polymer-based composite material with embedded fibers, e.g. glass or carbon fibers, for example a removed wind turbine blade):

A. Cut or pound the composite part into small pieces or fragments.

B. Introduce a suitable volume of such fragments 18 (FIG. 3) into the furnace chamber 10.

C. Pyrolyze (or, more generally, thermolize) the composite material 18 present in the furnace chamber 10 at a temperature of 350-600° C., preferably of about 550° C., until the matrix (for example, resin-made) of the composite material is completely decomposed.

D. Continuously extract the gaseous fraction produced in the pyrolysis through the first outlet 12, and crack this gaseous fraction by passing it through the reducing agent 21, which is kept at a temperature of 250-400° C., preferably of about 350° C.

E. Bring the gases produced in the cracking process into the condenser 31, where they are rapidly cooled down (to under 10° C.) in order to obtain two different fuels: a condensed gas (i.e. a liquid fuel to be sold or anyhow used) and a non-condensable gas which is separated and brought into the burner 11, after being filtered through filter 32.

The reducing agent 21 is thermostated, i.e., its temperature is carefully controlled in order to optimize the cracking reactions. The non-condensable gas or gases brought into the burner 11 are burned therein and thus contribute thermal energy to the pyrolysis (at the beginning, when this recycled fuel is not available yet, an external fuel can be used, for example propane), or, alternatively, instead of bringing the non-condensable gas to the burner 11, the non-condensable gas can be used to drive a turbine (not shown) in a cogeneration process. The condensed gases can be collected in different containers depending on their condensation temperatures.

Apart from the gaseous fraction, the other result of the pyrolysis is a heap of fibers covered with char 19 (FIG. 4), and the operation goes on as follows:

F. Just after the pyrolysis has been completed, inject a stream of an oxygen-containing gas (for example air or oxygen-enriched air, e.g. air enriched with 6%-volume of $O_2$) into the furnace chamber 10, which is still very hot from the pyrolysis (basically at the same temperature thereof), until the char is burned-out in an exothermic combustion, leaving the fibers clean.

G. Continuously extract the combusted gaseous stream from the furnace chamber 10 through the second outlet 14 and bring said combustion gases into the separator 41, e.g. a cyclone, where they are suitably treated and filtered (at least a part of the combustion gases are carried through the filters 42).

Figure 3:
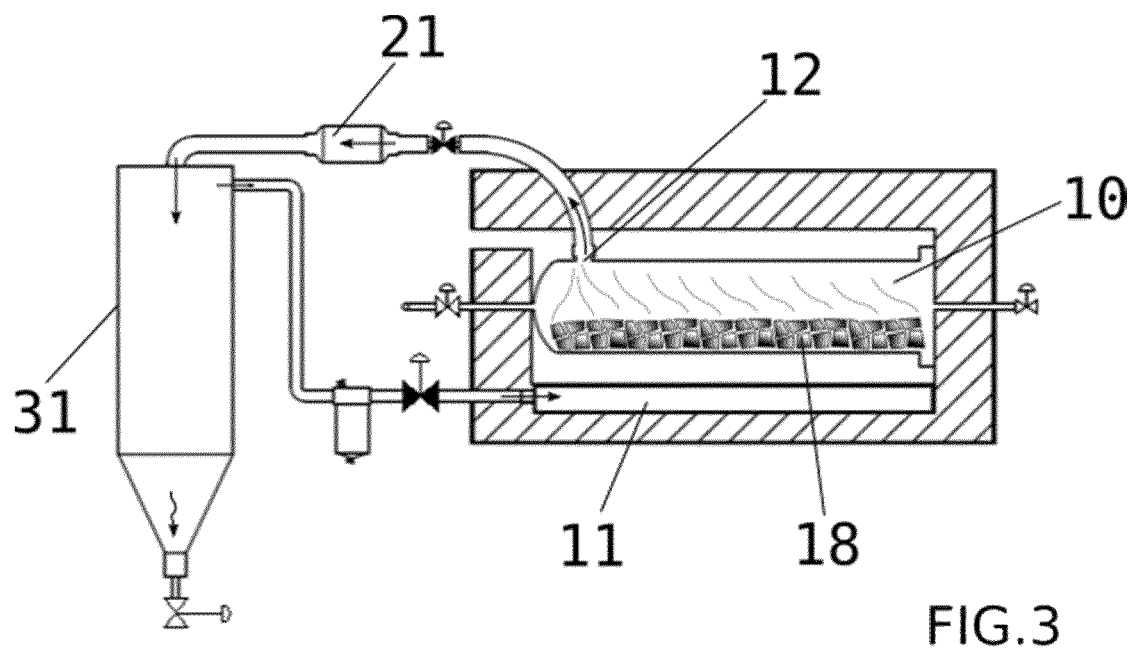
FIG. 3 is schematic view that illustrates a use of the apparatus of FIG. 1.

FIG. 3 shows the pyrolysis and cracking processes (operations C, D and E). The solid black valves represent open valves and the white valves represent closed valves. The straight arrows represent gas flows and the curved arrow at the bottom of the condenser 31 would represent a liquid flow (in case the corresponding bottom valve would be open).

Figure 4:
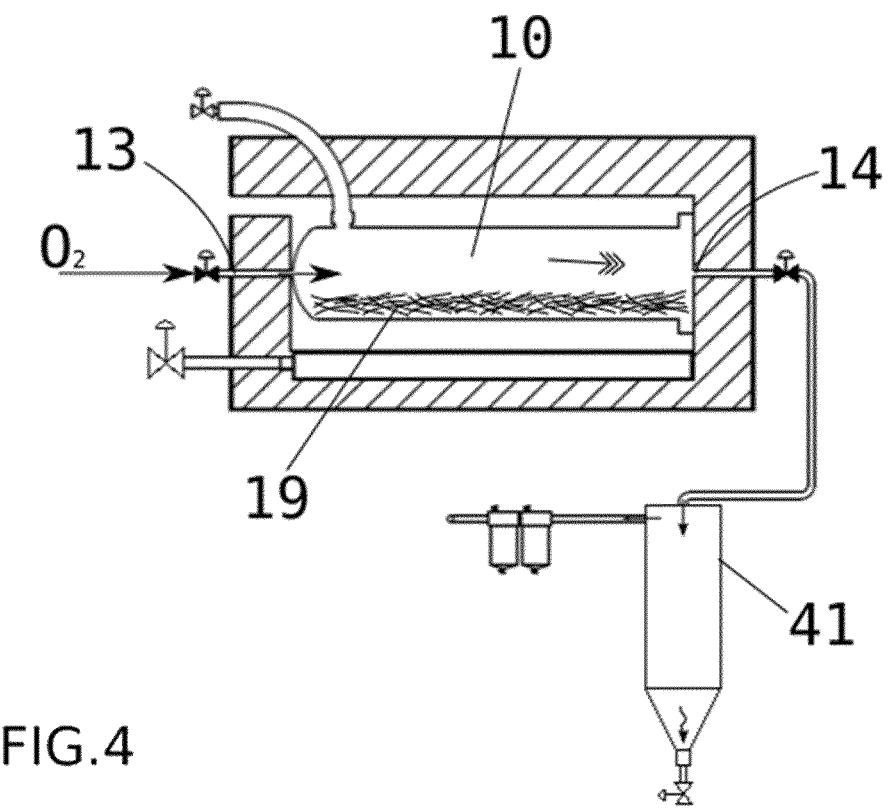
FIG. 4 is schematic view that illustrates another use of the apparatus of FIG. 1.

FIG. 4 shows the exothermic combustion (operations F and G); as before, the solid black valves represent open valves and the white valves represent closed valves, and the straight arrows represent gas flows. The multi-pointed arrow in chamber 10 represents the char combustion. Operation F can be termed 'exothermic sweeping'.

Figure 5:
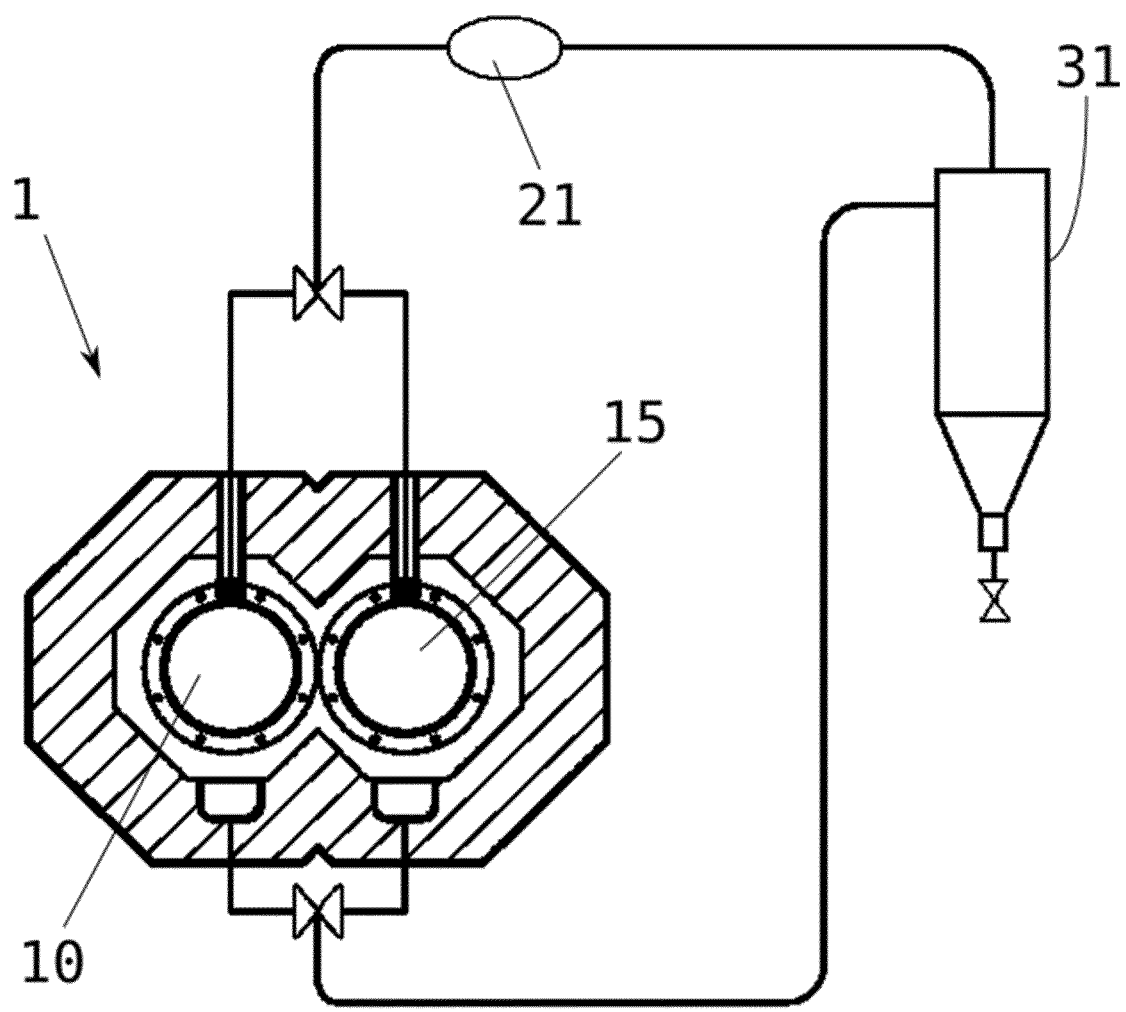
FIG. 5 is a schematic view of two furnace chambers of an apparatus for recovering fibers embedded in a composite material.

FIG. 5 shows another example in which the furnace 1 includes two furnace chambers, a first furnace chamber 10 and a second furnace chamber 15. This apparatus can be operated in batch mode as follows:

I. Load furnace chambers 10 and 15 with respective volumes of a composite material.
II. Pyrolyze the composite material present in first furnace chamber 10.
III. Exothermically sweep the char-covered fibers in first furnace chamber 10.
IV. Pyrolyze the composite material present in second furnace chamber 15 using heat from operation III; this pyrolysis and the exothermic sweeping of operation III can start simultaneously.
V. Unload the clean fibers from first furnace chamber 10 and load a volume of composite material therein.
VI. Exothermically sweep the char-covered fibers in second furnace chamber 15.
VII. Pyrolyze the composite material present in first furnace chamber 10 using heat from operation VI; this pyrolysis and the exothermic sweeping of operation VI can start simultaneously.
VIII. Unload the clean fibers from second furnace chamber 15 and, unless the current batch operation is finished, load a volume of composite material therein.
IX. Continue from operation III.

In experimental examples, the weight-ratio of recycled clean fibers to the fibers initially contained in the composite material was estimated to be of approximately 95%, which shows the effectiveness or the method described above. Besides, the method further produces energy (from the non-condensable gases) and fuel (the condensable gases).

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

The invention claimed is:

1. A method for recovering fibers embedded in a composite material including using two furnace chambers, the method comprising:
   loading a first furnace chamber with a volume of a composite material;
   thermolyzing the composite material in said first furnace chamber, resulting in a gaseous fraction that is continuously evacuated from the first furnace chamber, and a residue of fibers covered with char that is left in the first furnace chamber;
   cracking the gaseous fraction from the thermolyzing, resulting in a mixture of one or more condensable gases with one or more non-condensable gases;
   injecting a stream of an oxygen-containing gas into the still hot first furnace chamber after the thermolyzing is completed therein, to burn the char from the fibers in an exothermic combustion;
   loading a second furnace chamber with a volume of the composite material;
   thermolyzing the composite material in the second furnace chamber, with heat being contributed by the combustion that is taking or has taken place in the first furnace chamber, resulting in a gaseous fraction that is continuously evacuated from the second furnace chamber, and a residue of fibers covered with char that is left in the second furnace chamber;
   cracking the gaseous fraction from the thermolyzing in the second furnace chamber, resulting in a mixture of one or more condensable with one or more non-condensable gases;
   unloading clean fibers from the first furnace chamber and loading the first furnace chamber with a volume of the composite material;
   injecting a stream of an oxygen-containing gas into the still hot second furnace chamber after the thermolyzing is completed therein, in order to burn the char from the fibers in an exothermic combustion;
   thermolyzing the composite material in the first furnace chamber, with heat being contributed by the combustion that is taking or has taken place in the second furnace chamber, resulting in a gaseous fraction that is continuously evacuated from the first furnace chamber, and a residue of fibers covered with char that is left in the first furnace chamber;
   cracking the gaseous fraction from the thermolyzing in the first furnace chamber, resulting in a mixture of condensable and non-condensable gases;
   unloading clean fibers from the second furnace chamber and loading the second furnace chamber with a volume of the composite material;
   injecting a stream of an oxygen-containing gas into the still hot first furnace chamber after the thermolyzing is completed therein, to burn the char from the fibers in an exothermic combustion.

2. The method of claim 1, the thermolyzing being a pyrolysis.

3. The method of claim 2, the pyrolysis being performed with the first furnace chamber at a temperature of 350-600° C.

4. The method of claim 3, the oxygen-containing gas being air enriched with an additional 2-20% in volume of oxygen in comparison to normal air.

5. The method of claim 2, the cracking being performed by circulating the gaseous fraction through a reducing agent.

6. The method of claim 1, the cracking being performed by circulating the gaseous fraction through a reducing agent.

7. The method of claim 6, the reducing agent being kept at a temperature of 250-400° C.

8. The method of claim 1, further comprising using the one or more non-condensable gases for contributing heat to the first furnace chamber in the thermolyzing.

9. The method of claim 8, the thermolysis being performed under vacuum.

10. The method of claim 1, the thermolyzing being performed under vacuum.

11. The method of claim 1, the oxygen-containing gas being air enriched with an additional 2-20% in volume of oxygen in comparison to normal air.

12. The method of claim 1, the thermolyzing lasting between 1 and 4 hours.

13. The method of claim 1, the combustion lasting between 1 and 4 hours.

14. The method of claim 1, further comprising using the one or more non-condensable gases for contributing heat to one furnace chamber in the thermolyzing.

* * * * *